United States Patent [19]

Van Antwerp et al.

[11] 4,179,034
[45] Dec. 18, 1979

[54] BALE LOADER

[76] Inventors: Ferne Van Antwerp, Rte. #1, Unionville, Iowa 52594; Raymond R. Murdy, Rte. #2, Moulton, Iowa 52572

[21] Appl. No.: 744,774

[22] Filed: Nov. 24, 1976

[51] Int. Cl.² .............................................. B66F 9/18
[52] U.S. Cl. ................................... 414/551; 414/911; 414/428; 414/338; 414/684
[58] Field of Search ............ 214/766, 130 C, DIG. 4, 214/145 R, 350, 86 A, 78, 1 HH, 501; 254/139.1; 296/35 A, 23 MC

[56] References Cited

U.S. PATENT DOCUMENTS

| | | | |
|---|---|---|---|
| 1,276,430 | 8/1918 | Smith | 296/35 A |
| 3,896,956 | 7/1975 | Hostetler | 214/130 C |
| 3,897,880 | 8/1975 | Waske et al. | 214/1 HH |
| 3,957,167 | 5/1976 | Jacobson et al. | 214/145 R |
| 4,015,737 | 4/1977 | Wright et al. | 214/501 |
| 4,015,739 | 4/1977 | Cox | 214/130 C |
| 4,023,690 | 5/1977 | Goode | 214/78 |

OTHER PUBLICATIONS

Gold'n Spike Bale Carriers, Gold'n Industries.

Primary Examiner—Trygve M. Blix
Assistant Examiner—Ross Weaver
Attorney, Agent, or Firm—Snider, Sterne & Saidman

[57] ABSTRACT

A bale loader designed for use in combination with a pickup truck. The loader features a frame assembly which slides easily into and out of the bed of the pickup truck and which may be secured thereto and removed therefrom without the need for special tools. The bale fork portion of the loader is designed to be utilized either in connection with the pickup truck frame assembly or with a standard three-point tractor hitch. The base of the bale fork is pivotally mounted to the rear portion of the frame assembly. An adjustable mast extends vertically from the center post of the bale fork and has a pulley connected to the top portion thereof. A winch motor is attached to the forward portion of the frame assembly and drives a spool having a cable which engages the pulley for selective pivoting of the bale fork.

21 Claims, 6 Drawing Figures

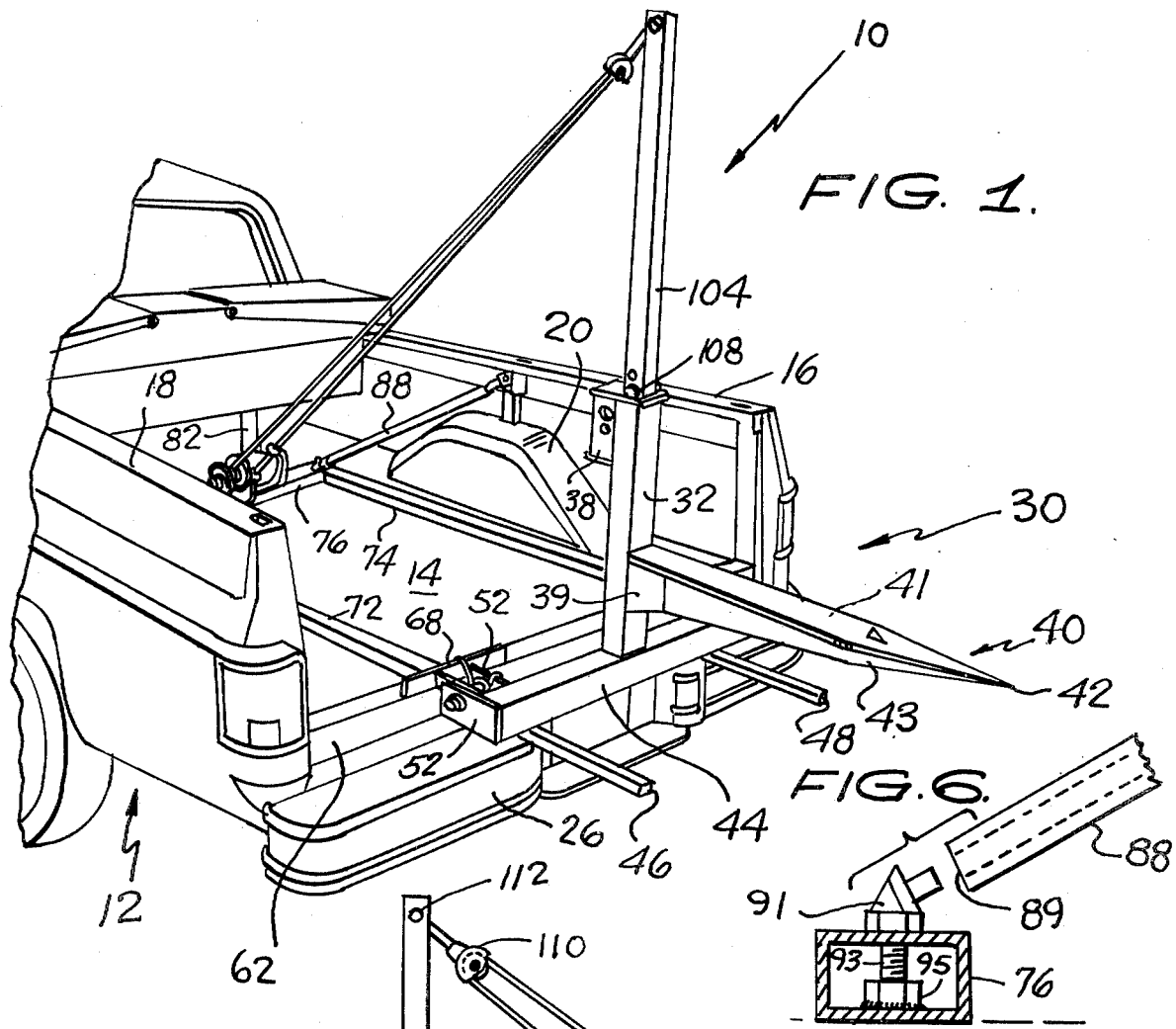
FIG. 1.
FIG. 6.
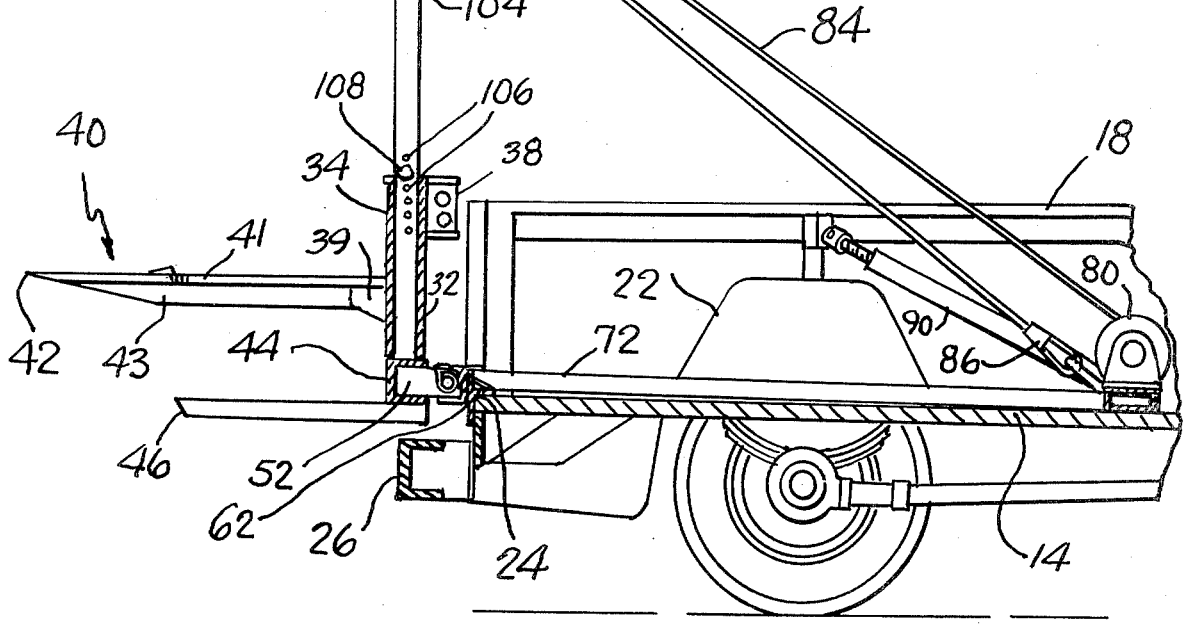
FIG. 2.

BALE LOADER

BACKGROUND OF THE INVENTION

1. Field of the Invention

The present invention is related to devices for loading and transporting a bale of hay and, more particularly, is directed towards a bale loader which may be used in combination with a pickup truck.

2. Description of the Prior Art

Modern hay balers are designed to form rather large generally cylindrical bales of hay which are on the order of six feet in diameter, five feet long, and weigh about 1,000 pounds or more. The enormity of the bales of hay thus formed makes the job of handling and transporting same one for which special equipment must be designed and utilized.

Several prior art patents of which I am aware are directed towards handling the large bales of hay produced by modern hay balers as above-described. These include U.S. Pat. Nos. 3,935,954; 3,896,956; 3,880,305; and 3,938,682.

More particularly, U.S. Pat. No. 3,935,954 teaches a two-wheel trailer utilized for a hay transport which includes a conventional trailer hitch socket for securing the transport to the rear end of a pickup truck. The bale of hay is loaded onto the trailer by actuation of a pair of hydraulic cylinders in combination with forward movement of the pickup truck.

U.S. Pat. No. 3,896,956 teaches a bale loader which is mountable on a pickup truck bed and which also utilizes a hydraulic cylinder for lifting the bale of hay, the bale loader being permanently attached to the pickup truck by means of conventional nuts and bolts.

While the devices described in the above-cited patents appear to be advances over the art then existing, they each nevertheless suffer from several deficiencies. The first-named patent, for example, sets forth a structure which is quite complex, requires an undue amount of space for operation, and which is expensive. The second-named patent describes a device which requires time-consuming and laborious installation, consists of a substantially permanent fixture in the bed of the truck to limit the utility of the latter, loads the bales of hay in a somewhat less than fully secure manner, and is therefore not a very versatile tool. Both structures require the use of expensive and maintenance-prone hydraulic cylinders for operation.

It is therefore apparent that a great need exists for a more simple, economical, and versatile bale loader which may be utilized either in conjunction with a pickup truck or, if desired, in combination with a conventional three-point tractor hitch.

OBJECTS AND SUMMARY OF THE INVENTION

It is therefore a primary object of the present invention to provide a bale loader for use in combination with a pickup truck which overcomes all of the disadvantages noted above with respect to prior art structures.

Another object of the present invention is to provide a bale loader which may be easily mounted and removed to or from the bed of a pickup truck without requiring any tools or excessive labor.

A still further object of the present invention is to provide a bale loader which may be utilized either in combination with a pickup truck, or in combination with a conventional three-point tractor hitch, at the option of the owner.

An additional object of the present invention is to provide an economical and versatile bale loader which may be readily adapted for use in combination with a pickup truck, and which obviates the need for expensive hydraulic cylinders of the prior art devices.

A still further object of the present invention is to provide a simple, economical, and versatile bale loader which may be easily mounted and removed in and from a pickup truck bed, which includes inexpensive motor means for loading the bale of hay, and which may be entirely operated and controlled from the cab of the pickup truck.

The foregoing and other objects are attained in accordance with one aspect of the present invention through the provision of the bale loader adapted to be mounted in the bed of a pickup truck, which comprises a frame assembly positionable in the bed of the pickup truck, means for releasably securing the frame assembly to the truck, fork means pivotally mounted to the frame assembly for engaging a bale of hay, and motor means mounted to the frame assembly for selectively pivoting the fork means.

More particularly, the frame assembly comprises a rear transverse frame member positioned in use along the rear edge of the truck bed, a front transverse frame member positioned in use near the front end of the truck bed, and rigid frame means preferably in the form of two longitudinal braces for connecting the front and rear frame members. More particularly, the rear transverse frame member comprises an angle iron, and the motor means is mounted on the front transverse frame member. Further, the fork means is pivotally mounted to the rear transverse frame member and more specifically comprises a transverse base member, a main center post extending substantially perpendicularly from the base member, and a main lifting prong which extends substantially perpendicularly from the main center post. The main lifting prong of the fork means extends in use rearwardly of the truck bed and is tapered to a point for pierceably engaging a bale of hay upon rearward movement of the truck. The fork means may further comprise a pair of auxiliary lifting prongs which also extend rearwardly from the base member parallel to and below the main lifting prong.

In accordance with yet other aspects of the present invention, a vertically adjustable mast is also provided and is telescopically mounted within the main center post of the fork means. Means are also provided for operatively interconnecting the motor means to the mast, said means more particularly comprising a cable wound on a spool which is driven by the motor. The cable extends through a pulley that is connected near the upper end of the mast to a fixed point near the forward end of the truck bed, preferably on the front transverse frame member.

In accordance with yet other aspects of the present invention, the rear transverse frame member includes a pair of apertured flanges that extend rearwardly therefrom, the transverse base member including cooperating apertured flange means for pivotal interconnection with the apertured flanges of the transverse base member. The main center post of the fork means further also includes parallel flange means that extend forwardly from the upper end thereof and which have apertures formed therethrough which permit mounting of the fork means to a standard three-point tractor hitch, if desired.

In accordance with yet other aspects of the present invention, the above-named means for releasably securing the frame assembly to the truck comprises means for diagonally interconnecting the front transverse frame member to the respective sides of the pickup truck. In a preferred mode, the diagonal interconnecting means comprises a pair of braces each of which has a threaded member adjustably extendable from one end thereof to engage the sides of the truck for selectively bracing the frame assembly within the bed of the truck.

BRIEF DESCRIPTION OF THE DRAWINGS

Various objects, features and attendant advantages of the present invention will be more fully appreciated as the same become better understood from the following detailed description thereof when considered in connection with the accompanying drawings, in which:

FIG. 1 is a perspective view which illustrates a preferred embodiment of the present invention when mounted in the rear bed of a pickup truck;

FIG. 2 is a cross-sectional view of the preferred embodiment illustrated in FIG. 1;

FIG. 6 is a sectional view illustrating the preferred manner of interconnecting the diagonal braces with the main frame member of the present invention.

DETAILED DESCRIPTION OF THE PREFERRED EMBODIMENT

Figure 3:
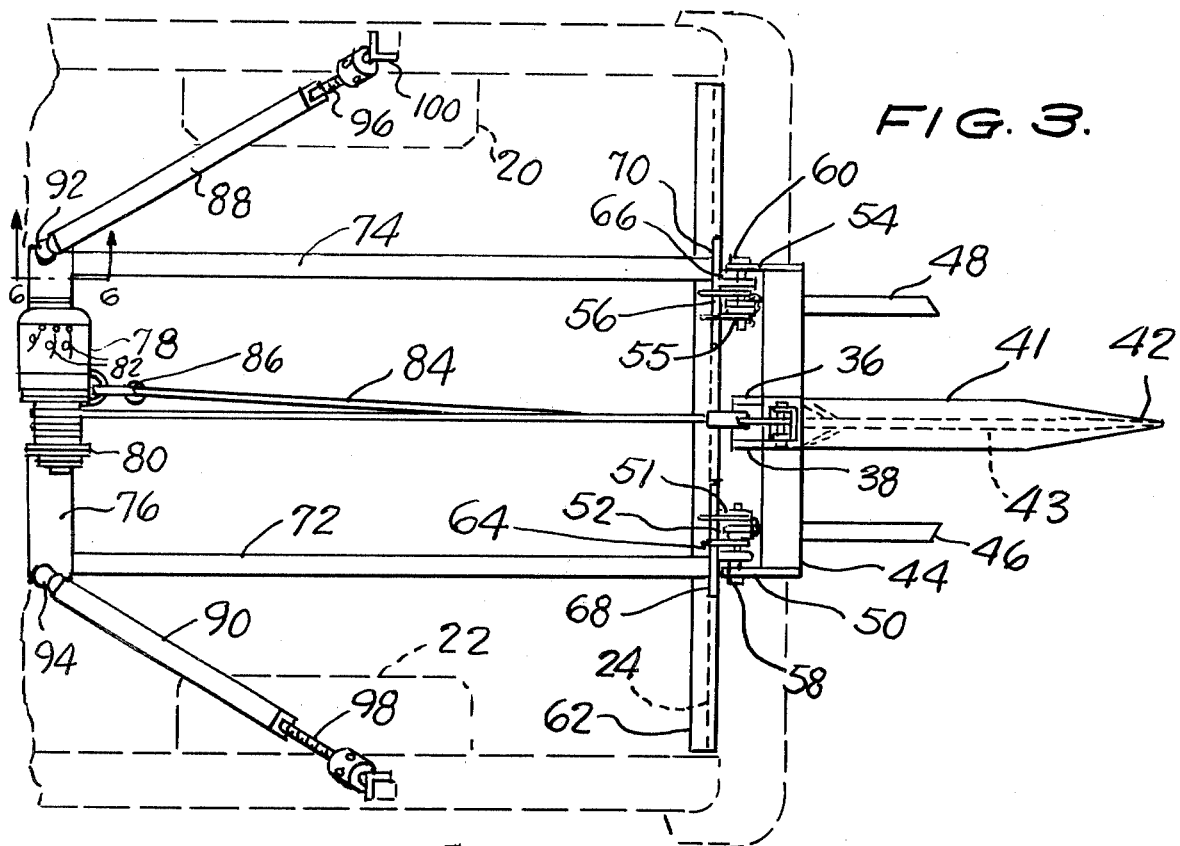
FIG. 3 is a top plan view which illustrates the preferred embodiment of the present invention shown in FIG. 1.

Referring now to the drawings, wherein like reference numerals indicate identical or corresponding parts throughout the several views, and more particularly to FIG. 1 thereof, the bale loader of the present invention is indicated generally by the reference numeral 10 and is shown mounted on the rear bed 14 of a pickup truck 12. Pickup truck 12 also conventionally includes a pair of parallel sidewalls 16 and 18 adjacent to which are formed a pair of rear wheel wells 20 and 22, respectively. The rear edge or end of the truck bed 14 is indicated in FIG. 2 by the reference numeral 24, while the rear bumper of the truck is indicated by reference numeral 26.

The bale loader 10 of the present invention includes a unitary bale fork which is indicated generally by reference numeral 30 and which is shown connected to a pickup truck frame assembly for mounting in the bed 14 of the truck 12. The bale fork 30 comprises a main vertical post 32 having a central mounting aperture 34(FIG. 2) formed therein for a purpose to be described in more detail hereinafter.

Extending forwardly from the top portion of the main vertical post 32 are a pair of parallel flanges 38 which have mounting apertures formed therein to permit the bale fork 30 to be mounted to a standard three-point tractor hitch, as is clear to a person of ordinary skill in the art.

Extending integrally from the rear face of main vertical post 32, at a predetermined height thereon, is a main lifting prong which is indicated generally by reference numeral 40. Prong 40 includes an upper horizontal member 41 from the underside of which is perpendicularly connected a vertical support member 43. Support flanges 39 extend from the vertical post 32 to act as braces for both the upper and lower support members 41 and 43. Members 41 and 43 terminate in a pointed end 42 to facilitate the insertion of lifting prong 40 into a bale of hay, in a manner to be described in more detail hereinafter.

The unitary bale fork 30 further comprises a transverse pivotable base member 44 to the center portion of which is connected the main vertical post 32. On the underside of the base member 44 are connected a pair of spaced, parallel, supplementary lifting tangs 46 and 48 which further assist in the bale-lifting operation to be described below.

From each end of the pivotable base member 44 forwardly extend two pair of mounting flanges 50 and 52, and 54 and 56 (see FIG. 3). Mounting flanges 50, 52, 54 and 56 are each provided with aligned apertures for receiving pivot pins 58 and 60, respectively. A pair of return springs 51 and 55 are respectively wrapped about pivot pins 58 and 60, and flanges 52 and 56.

The frame assembly which permits the bale fork 30 to be utilized in combination with the pickup truck 12 includes a rear transverse frame member 62 which is preferably comprised of an angle iron whose perpendicular members engage the rear edge 24 of the truck bed 14 to prevent forward movement of the frame assembly as is clear from FIG. 2. Frame member 62 also preferably extends along the entire width of rear edge 24 of truck 12, from the inner surface of wall 16 to that of wall 18, to prevent sideways movement of the bale loader in the bed 14.

A pair of pivot flanges 64 and 66 extend rearwardly from the rear transverse frame member 62 (FIG. 3). Pivot flanges 64 and 66 have apertures formed therein which align with those apertures formed in flanges 50, 52, 54 and 56 for receiving the pivot pins 58 and 60. Mounted on the upper surface of rear transverse frame member 62 are a pair of support flanges 68 and 70 which are aligned laterally with the pivot flanges 64 and 66. Support flanges 68 and 70 act as pivot stops when the bale fork 30 is pivoted to its vertical position, and also are engaged by the respective ends of return springs 51 and 55.

Mounted on top of the rear transverse frame member 62 and extending in a parallel fashion forwardly and longitudinally along the bed 14 of truck 12 are a pair of side frame members 72 and 74. The side frame members 72 and 74 may be positioned in juxtaposition to the rear wheel wells 20 and 22 in order to further limit lateral movement of the bale loader 10. Connected across the distal ends of side frame members 72 and 74 is a front transverse frame member 76.

Mounted by any conventional means to the upper surface of the forward transverse frame member 76 is preferably a winch motor indicated generally by reference numeral 78. The operation of winch motor 78 may be controlled from the cab of the pickup truck via a conventional electrical switch (not shown) which may be electrically interconnected to motor 78 via electrical leads 82.

The output shaft of motor 78 is coupled to rotate a spool 80. One end of a cable 84 is wound about spool 80, the other end of cable 84 being journaled to either the motor assembly or the frame assembly as at 86.

The cable 84 extends through a pulley 110 which is pivotally attached as at 112 to the upper portion of a vertically adjustable mast 104. Mast 104 is designed to fit within the vertical aperture 34 formed in post 32 of bale fork 30. Positioned laterally through mast 104 are a plurality of height-adjusting apertures 106 through one of which a pin 108 extends to fix the height of mast 104. Adjusting the height of mast 104 in turn adjusts the amount of leverage exercisable by the bale loader 10 of the present invention, the particular height selected dependent upon, inter alia, the size and capacity of winch motor 80 as well as that of the bale of hay to be transported.

To complete the structure of the preferred embodiment of the present invention, means are provided which permit easy mounting and dismounting of the frame members 62, 72, 74 and 76 to and from the truck bed 14. Such means take the form of a pair of internally threaded diagonal mounting braces 88 and 90 which may be pivotally secured, as at 92 and 94, to the forward ends of front transverse frame member 76. As seen in FIG. 6, one end of braces 88 and 90 is open as at 89 to be pivotally received by a swing bolt 91. Each of the swing bolts 91 is mounted to an end of front transverse frame member 76 by a threaded bolt 93 which is secured to a nut 95 which may be, for example, welded to the inner bottom surface of member 76.

The distal end of the diagonal mounting braces 88 and 90 are internally threaded for adjustably receiving a pair of externally threaded arms 96 and 98 which are respectively designed to be selectively secured to a pair of exposed vertical frame members 100 and 102 formed in the sidewalls 16 and 18 of the truck 12. For those trucks which do not have internally exposed frame members 100 and 102, a pair of brackets or the like may be easily secured in the proper position.

The entire frame assembly may be simply and easily secured within the bed 14, or released therefrom, by simply rotating the diagonal braces 88 and 90 to adjust the extension of arms 96 and 98. Note that the diagonal braces 88 and 90 secure the frame members against upward and rearward movement, while the angle iron 62 secures the frame member against forward movement, the combination providing a most secure and rigid mounting of the bale loader 10 to the bed 14 of the truck. Further, the pivotal connection of braces 88 and 90 as at swing bolts 91 provides a universal mount for differing width truck beds.

Figure 4:
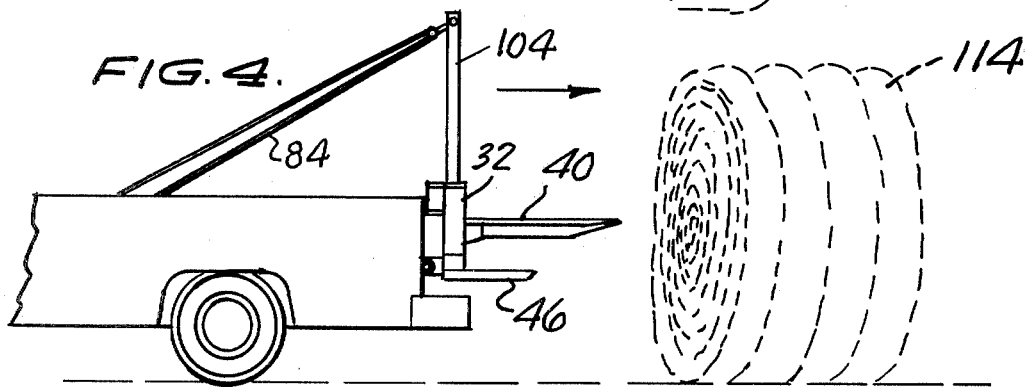
FIG. 4 is a side view which schematically illustrates how the preferred embodiment of the present invention may be utilized to load a bale of hay.
Figure 5:
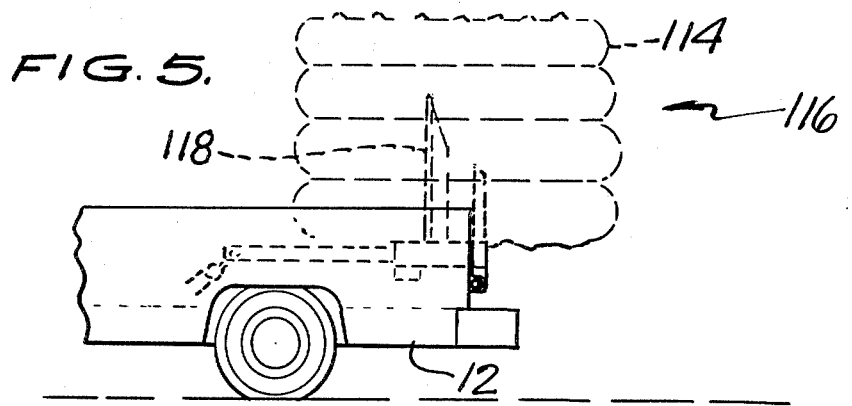
FIG. 5 is a side view of the truck illustrated in FIG. 4 but showing the bale of hay in a loaded position.

Referring now to FIGS. 4 and 5, utilization of the bale loader 10 of the present invention will now be explained. After the assembly has been secured within the bed 14 of the truck as above-described, the truck 12 may be backed up after being properly aligned with the longitudinal axis of the jumbo bale of hay 114. Note that the height of the main prong 40 is designed so as to intercept the bale 114 at approximately the midpoint thereof. Lower tangs 46 and 48 also pierceably engage the bale 114 to further assist in the mounting operation. After the tangs 40, 46 and 48 are firmly seated within the bale, the winch motor 78 is actuated so as to draw down, via cable 84, the top of mast 104, to retract same towards the bed 14 of the truck. This action serves to tilt and lift the bale 114 to the loaded position indicated generally by reference numeral 116 in FIG. 5. To release the bale 114, the motor shaft is released and the return springs 51 and 55 will act to automatically return the bale fork 30 to the position shown in FIG. 4.

Also shown in dotted outline in FIG. 5, and indicated by reference numeral 118, is the travel or storage position of the bale fork assembly, which is achieved simply by fully winding in the cable 84 onto spool 80. The position 118 of the bale fork shown in FIG. 5 is also the position of the assembly which permits the entire unit to be most easily mounted and removed to and from the bed of the truck. For travel or storage, the present invention therefore presents a most compact structure, which does not protrude rearwardly of the truck when not in use, and which may be easily removed from the truck to free the latter for other uses. Further, the unitary bale fork 30 has means which permit same to be utilized equally well with a conventional three-point tractor hitch.

Obviously, numerous modifications and variations of the present invention are possible in light of the above teachings. It is therefore to be understood that within the scope of the appended claims, the invention may be practiced otherwise than as specifically described herein.

We claim as our invention:

1. A bale loader adapted to be mounted in the bed of a pickup truck, which comprises:
    a frame assembly positionable in the bed of a pickup truck, said frame assembly including a rear transverse frame member positioned in use along the rear edge of said truck bed, a front transverse frame member positioned in use toward the front end of said truck bed, and rigid frame means connecting said front and rear frame members;
    means for releasably securing said frame assembly to said truck comprising means for diagonally interconnecting said front transverse frame member to the respective sides of said pickup truck;
    fork means mounted to said frame assembly for engaging a bale of hay; and
    motor means mounted to said frame assembly for selectively operating said fork means.

2. The bale loader as set forth in claim 1, wherein said rear transverse frame member comprises an angle iron, and wherein said motor means is mounted on said front transverse frame member.

3. The bale loader as set forth in claim 1, wherein said fork means is pivotally mounted to said rear transverse frame member.

4. The bale loader as set forth in claim 3, wherein said fork means comprises a transverse base member, a main center post extending substantially perpendicularly from said base member, and a main lifting prong extending substantially perpendicularly from said main center post.

5. The bale loader as set forth in claim 4, wherein said main lifting prong extends in use rearwardly of said truck bed and is tapered to a point for pierceably engaging a bale of hay upon rearward movement of said truck.

6. The bale loader as set forth in claim 5, further comprising a pair of auxiliary lifting prongs extending rearwardly from said base member parallel to and below said main lifting prong.

7. The bale loader as set forth in claim 4, further comprising a vertically adjustable mast telescopically mounted within said main center post.

8. The bale loader as set forth in claim 7, further comprising means for operatively interconnecting said motor means to said mast.

9. The bale loader as set forth in claim 8, wherein said means for operatively interconnecting said motor means to said mast comprises a cable wound on a spool driven by said motor means and extending through a pulley connected near the upper end of said mast to a fixed point near the forward end of said truck bed.

10. The bale loader as set forth in claim 4, wherein said rear transverse frame member includes a pair of apertured flanges extending rearwardly therefrom, and wherein said transverse base member includes apertured flange means for pivotal interconnection with said apertured flanges of said transverse frame member.

11. The bale loader as set forth in claim 10, wherein said main center post further includes parallel flange means extending forwardly from the upper end thereof and having apertures formed therein for permitting mounting of said fork means to a standard three-point tractor hitch.

12. The bale loader as set forth in claim 1, wherein said diagonally interconnecting means comprises a pair of braces each having a threaded member adjustably extendible from one end thereof to selectively brace said frame assembly to said sides of said truck.

13. A bale loader adapted to be mounted in a pickup truck having a pair of side walls, and a bed extending between the side walls and having a rear edge depending downwardly therefrom, which comprises:
means for loading a bale of hay mounted on a frame assembly positionable in the bed of said truck, said frame assembly including means for preventing lateral movement of said frame assembly in said bed, means for preventing forward movement of said frame assembly in said bed, and means for preventing rearward and vertical movement of said frame assembly in said bed, said means for preventing lateral movement comprising a rear frame member extending transversely across the entire width of said bed between said side walls, said means for preventing forward movement comprising means projecting perpendicularly from said rear frame member for engaging said downwardly depending rear edge of said bed, and said means for preventing rearward and vertical movement comprising brace means adjustably connected between the forward portion of said frame assembly and said pair of side walls.

14. The bale loader as set forth in claim 13, wherein said means for preventing lateral and forward movement comprises an angle iron adapted to engage said rear edge of said bed.

15. The bale loader as set forth in claim 13, wherein said brace means comprises a pair of threaded braces each of which is adapted to extend vertically and rearwardly from said forward portion of said frame assembly to one of said side walls.

16. The bale loader as set forth in claim 15, wherein each of said braces is pivotally mounted to said frame assembly.

17. A frame assembly designed to be easily secured to and removed from a pickup truck without requiring tools, said truck having side walls, and a bed extending between said side walls and having a rear edge, said frame assembly comprising:
first means adapted to extend transversely across the entire width of said bed between said side walls near said rear edge thereof for preventing lateral movement of said frame assembly;
second means connected to said first means and adapted to engage said rear edge of said bed for preventing forward movement of said frame assembly; and
third and fourth means adjustably extending vertically and rearwardly from the front portion of said frame assembly and adapted to engage the respective side walls of said truck for preventing vertical and rearward movement of said frame assembly.

18. The frame assembly as set forth in claim 17, wherein said first and second means comprises a rear frame member having a horizontal flange and a vertical flange.

19. The frame assembly as set forth in claim 18, wherein said rear frame member comprises an angle iron.

20. The frame assembly as set forth in claim 17, wherein said third and fourth means comprise a pair of braces pivotally mounted to said front portion of said frame assembly.

21. The frame assembly as set forth in claim 20, wherein each of said braces include threaded means for adjusting the length thereof.

* * * * *